(12) United States Patent
Spooner

(10) Patent No.: US 8,726,626 B2
(45) Date of Patent: May 20, 2014

(54) COMBUSTOR FOR A GAS TURBINE ENGINE

(71) Applicant: Rolls-Royce PLC, London (GB)

(72) Inventor: Michael Paul Spooner, Derby (GB)

(73) Assignee: Rolls-Royce PLC, London (GB)

( * ) Notice: Subject to any disclaimer, the term of this patent is extended or adjusted under 35 U.S.C. 154(b) by 0 days.

(21) Appl. No.: 13/716,953

(22) Filed: Dec. 17, 2012

(65) Prior Publication Data
US 2013/0174557 A1    Jul. 11, 2013

(30) Foreign Application Priority Data
Jan. 9, 2012    (GB) .................................... 1200237.4

(51) Int. Cl.
*F02C 7/057*    (2006.01)

(52) U.S. Cl.
USPC .......................................................... 60/39.23

(58) Field of Classification Search
CPC ..................................... F23R 3/04; F23R 3/26
USPC .......................... 60/39.23, 722, 752–760, 806
See application file for complete search history.

(56) References Cited

U.S. PATENT DOCUMENTS

| | | | | |
|---|---|---|---|---|
| 3,869,246 A | * | 3/1975 | Hammond et al. | 431/351 |
| 3,958,413 A | * | 5/1976 | Cornelius et al. | 60/778 |
| 4,807,433 A | * | 2/1989 | Maclin et al. | 60/795 |
| 5,470,198 A | * | 11/1995 | Harrogate et al. | 415/115 |
| 5,557,920 A | * | 9/1996 | Kain | 60/39.23 |
| 6,547,257 B2 | * | 4/2003 | Cromer | 277/630 |
| 6,892,543 B2 | * | 5/2005 | Nakae | 60/773 |
| 2005/0095542 A1 | | 5/2005 | Sanders et al. | |
| 2006/0042260 A1 | * | 3/2006 | Webster et al. | 60/772 |

FOREIGN PATENT DOCUMENTS

JP    A-2000-257861    9/2000

OTHER PUBLICATIONS

Mar. 5, 2012 British Search Report issued in Application No. GB1200237.4.

* cited by examiner

*Primary Examiner* — Phutthiwat Wongwian
(74) *Attorney, Agent, or Firm* — Oliff PLC

(57) ABSTRACT

A combustor in a gas turbine engine has a wall which forms a gap with an outer nozzle guide vane platform. A closure mechanism is operable to open or close the gap. Opening of the gap, for example during cruise conditions, reduces the mass flow rate of air through an open end of the combustor, so enriching the air fuel ratio and improving flame stability and combustion efficiency. Under high power conditions, the gap is closed, causing an increase in air flow rate through the open end to achieve a lean burn air fuel ratio when the fuel flow rate is increased.

17 Claims, 2 Drawing Sheets

COMBUSTOR FOR A GAS TURBINE ENGINE

BACKGROUND

This invention relates to a combustor for a gas turbine engine, and particularly, although not exclusively, for a gas turbine aeroengine.

The thrust generated by a gas turbine engine is modulated by varying the flow of fuel to the combustor or combustors. Efficient combustion requires the air/fuel ratio of the air/fuel mixture to be maintained within close limits. Efficient combustion is desirable both because it minimises undesirable emissions, such as NOx and CO emissions, and because it improves specific fuel consumption (SFC).

It is known to provide air flow restricting mechanisms at the combustor inlet so as to vary the quantity of air available for mixture with the fuel. However, such mechanisms can be complex and are not suited to operation in the hostile environment which exists at the combustor inlet.

US 2005/095542 discloses a gas turbine engine combustor having a variable-geometry air inlet for supplying air to a pre-mixing zone of the combustor. US 2005/095542 also discloses dilution ports in a liner of the combustor, which ports have adjustable flow areas controlled by valves.

Since the dilution ports are at separate locations around the combustor liner, the air flow admitted through them to the combustor is not distributed evenly, and consequently temperature differentials around the axis of the combustor can arise owing to the introduction of low temperature air at discrete positions around the axis of the combustor.

SUMMARY

According to the present invention there is provided a combustor for a gas turbine engine, the combustor comprising a housing having a circumferential wall defining a circumferential gap which provides communication between the interior and the exterior of the housing, an annular closure mechanism being provided which is displaceable into and out of a closing relationship with the gap.

In the context of this specification, the expression "circumferential gap" is to be interpreted as meaning that the gap extends continuously, or substantially continuously, around the entire circumference of the circumferential wall.

The closure mechanism may comprise an actuator device which is displaceable radially with respect to an axis of the housing. The actuator device may comprise an array of arcuate actuator elements which extends circumferentially of the housing. The actuator elements may be displaceable by a common actuator. Adjacent circumferential edges of adjacent ones of the actuator elements may engage one another in a sealing manner.

An annular sealing element may be disposed between the housing and the closure mechanism. The sealing element may comprise an annular leaf spring.

The sealing element may comprise a retaining portion which is secured with respect to the housing, and a sealing lip which is displaceable relatively to the retaining portion for engagement with the closure mechanism. The sealing element may be disposed so that a pressure difference between the interior and the exterior of the housing biases the sealing lip towards the closure mechanism.

The sealing element may be disposed on one side of the gap, and a second sealing element may be disposed on the other side of the gap for sealing engagement with the closure mechanism throughout the full range of movement of the closure mechanism. In an alterative embodiment, the sealing element may be mounted on one side of the gap, for engagement with the other side of the gap under the action of the closure mechanism. The closure mechanism may engage the sealing element at a position nearer to the retaining portion than the sealing portion, to provide a mechanical advantage between the displacement of the actuator device and the sealing portion.

The closure mechanism may be controlled by modulating means to vary the flow area of the gap between a fully closed and a fully open position.

BRIEF DESCRIPTION OF THE DRAWINGS

For a better understanding of the present invention, and to show more clearly how it may be carried into effect, reference will now be made, by way of example, to the accompanying drawings, in which.

DETAIL DESCRIPTION

Figure 1:
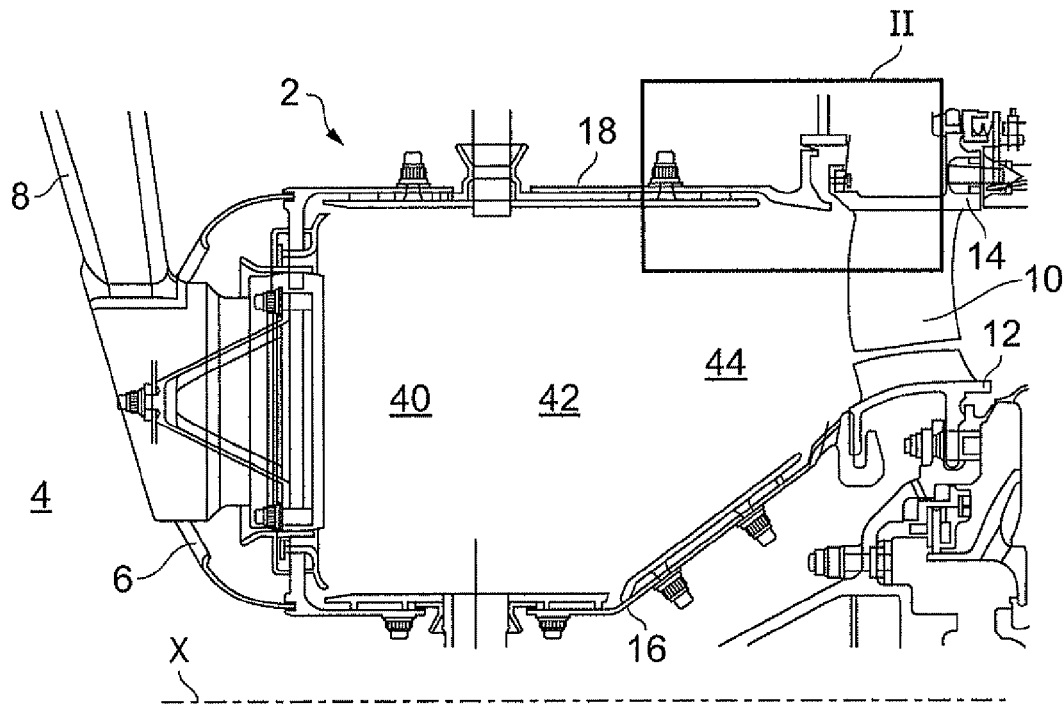
FIG. 1 is a partial sectional view of an annular combustion chamber having a gap closure mechanism, mounted in a gas turbine aeroengine.

The combustor 2 shown in FIG. 1 is an annular combustion chamber centred on the axis X of the engine. The axis X is shown only for purposes of reference in FIG. 1; in fact it is situated further than shown from the section of the combustion chamber 2 visible in FIG. 1.

The combustor 2 is situated downstream of the high pressure (HP) compressor of the engine. High pressure air issuing from the HP compressor is discharged into a region 4 of the engine which surrounds the annular combustor 2. The forward end 6 of the combustor 2 is open to allow air from the region 4 to enter the interior 8 of the combustor 2. A fuel delivery device 8 having a spray nozzle 9 is provided for delivering fuel to the interior of the combustor 2.

The aft end of the combustor 2 opens at an array of nozzle guide vanes 10 at the entry to the turbine section of the engine. The nozzle guide vanes 10 extend between inner and outer annular vane platforms 12, 14. The combustor 2 comprises inner and outer annular walls 16, 18 which terminate respectively at the inner and outer vane platforms 12, 14.

Figures 2, 3:
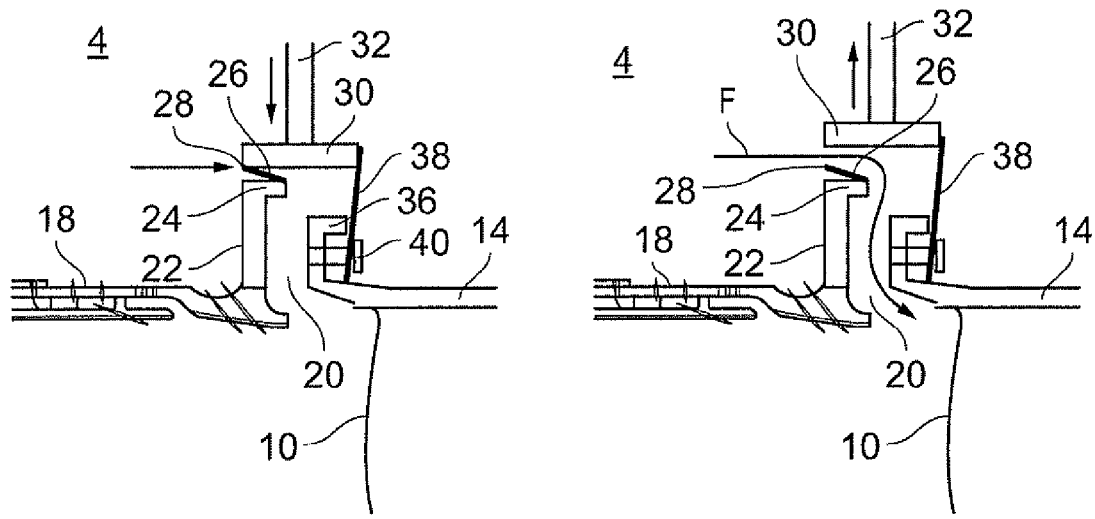
FIG. 2 is an enlarged view of the portion II of FIG. 1, showing a closure mechanism in the closed configuration.
FIG. 3 corresponds to FIG. 2, but shows the closure mechanism in an open configuration.

As shown in FIG. 2, the outer wall 18 of the combustor 2 terminates short of the outer vane platform 14 to leave a gap 20.

The outer wall 18 terminates at a flange 22 having a rim 24. The outer surface of the rim 24 carries a sealing element 26 in the form of an annular leaf spring. The leaf spring 26 is secured at one edge, to the outer surface of the rim 24, so that the edge constitute a retaining portion of the leaf spring 26. The leaf spring 26 extends obliquely away from the rim 24 in the forwards direction, and terminates at a sealing lip 28.

Figure 4:
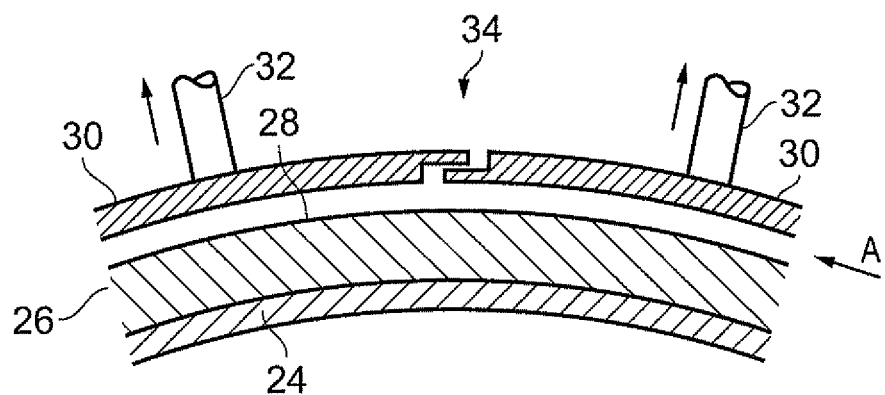
FIG. 4 is a fragmentary cross-sectional view of FIG. 3.

As shown in FIG. 4, the leaf spring 26 is surrounded on its outside by a closure mechanism comprising an actuator device formed from an array of arcuate actuator elements 30. Each actuator element 30 has an operating member 32, and the operating members 32 are controlled by a common control mechanism to displace the actuator elements radially inwardly and outwardly in unison. Adjacent actuator elements 30 engage one another at an overlapping joint 34, which provides a seal between the actuator elements 30.

On the other side of the gap 20 from the flange 22, the outer vane platform 14 is provided with a circumferential rib 36 which supports a second annular leaf seal 38. The second leaf seal 28 is supported on the rib 36 by a series of pins 40, and is biased into contact with the aft edges of the actuator elements 30.

In the configuration shown in FIG. 2, the actuator elements 30 are displaced radially inwards, into a closing relationship with the gap 20, in which they contact the sealing lip 28 of the leaf spring 26. This prevents air from flowing between the rim 24 and the actuator elements 30 to the gap 20. On the other side of the gap from the leaf spring 26, the second leaf spring 38 provides a further seal between the region 4 and the gap 20. Consequently, no flow can take place through the gap 20 to the interior of the combustor 2 from the outside region 4.

In the configuration shown in FIG. 3, the actuator elements 30 are displaced radially outwardly from the closing relationship, and so lose contact with the sealing lip 28 of the leaf spring 26. The second leaf spring 38, however, remains in contact with the aft edges of the actuator elements 30, so that flow past the second leaf spring 38 to the gap 20 is prevented. In the condition shown in FIG. 3, flow can take place, as indicated by an arrow F, from the region 4 through the gap 20 to the interior of the combustor 2.

In operation of the combustor 2, a proportion of the total output of the HP compressor flows from the region 4 through the open end 6 of the combustor to be mixed with fuel issuing from the spray nozzle 9. This mixing occurs in a pre-mixing zone 40 within the combustor, and the air-fuel mixture is initially ignited by means of a spark to create a flame which is subsequently self-sustaining. Combustion continues in a reaction zone 42 in which secondary air is admitted through fixed apertures in the walls 16, 18. The secondary air mixes with the combustion products in a dilution zone 44 so as to cool the combustion products before they travel past the nozzle guide vanes 10 to the turbine section of the engine.

In a typical engine with the gap 20 closed by the actuator elements 30, approximately 70% of the flow from the HP compressor into the region 4 will flow through the open end 6 of the combustor 2, with the remainder of the air from the region 4 flowing into the combustor 2 through the apertures in the walls 16, 18.

During high power operation of the engine, for example during take-off and climb, the gap 20 is closed by the actuator elements 30, which assume the position shown in FIG. 2. In this condition, the pressure drop from the region 4 to the interior of the combustor 2 will act on the leaf spring 26 to urge the sealing lip 28 into contact with the actuator elements 30. With the gap 20 closed, maximum flow takes place through the open forward end 6 of the combustor 2, to achieve the desired air/fuel ratio with the increased fuel delivery required for high power operation. Under cruise conditions, when the fuel flow rate is reduced, the actuator elements 30 are displaced radially outwardly, as shown in FIG. 3, to admit a proportion of the air from the region 4 to the interior of the combustor 2 immediately upstream of the nozzle guide vanes 10. This reduces the proportion of the air from the region 4 flowing through the open end 6 of the combustor 2, so as to match the reduced fuel flow rate.

In practice, it is usually desirable for the combustion process to take place with a relatively lean air fuel ratio under high power conditions, and with a relatively rich air fuel ratio under low power conditions. For example, when the actuators 30 are displaced to allow the flow F through the gap 20, between 5 and 15% of the HP compressor exit mass flow may pass through the gap 20. If 12% of the compressor exit mass flow passes through the gap 20, the pressure drop between the compressor outlet (conventionally referred to as P30) and the combustor interior may be reduced by 25% from a value of, for example, 4.5% of P30 to 3.6% of P30. The reduced air flow through the open end 6 of the combustor 2 enriches the fuel air mixture by approximately 12%, and this raises the flame temperature, so improving the stability of the flame and realising an improvement in combustion efficiency.

Furthermore, the distribution of pressure drop for the air entering the combustor through the gap 20 can be arranged so that the flow velocity can be optimised to the performance requirements of the nozzle guide vanes 10.

The reduced fuel injector air flow (i.e. air flow through the open end 6 of the combustor 2) not only increases the flame temperature, but also increases the combustion residence time, so promoting combustion efficiency. The ability to modulate the fuel injector air flow by opening and closing the gap 20 to the flow F means that combustion efficiency, and low emissions, can be achieved both under high power operation of the engine and during cruise at relatively low power. Consequently, both low NOx at high power, lean burn operation and low CO emissions under cruise conditions can be achieved.

Additionally, the ability to vary the mass flow rate of air through the open end 6 of the combustor by opening and closing the gap 20 enables a turndown ratio (the ratio between maximum and minimum fuel flow rates) of 6 to 8 to be achieved while maintaining desired emission and SFC levels.

Furthermore, the reduction in combustion pressure drop from 4.5% P30 to 3.6% P30, i.e. a pressure drop difference of 0.9%, yields an improvement in SFC of, for example, 0.2%.

A further advantage of the ability to admit air to the combustor through the gap 20 is improved relighting of the engine following flame out at altitude. An engine configured for lean burn can be difficult to relight at altitude, owing to the high combustor loading (i.e. the high flow rate of air through the open end 6 of the combustor 2). By opening the gap 20 to the flow F, the air flow velocity at the spray nozzle 9 is reduced, which can increase the altitude at which relighting can occur by, for example, approximately 600 metres.

Figure 5:
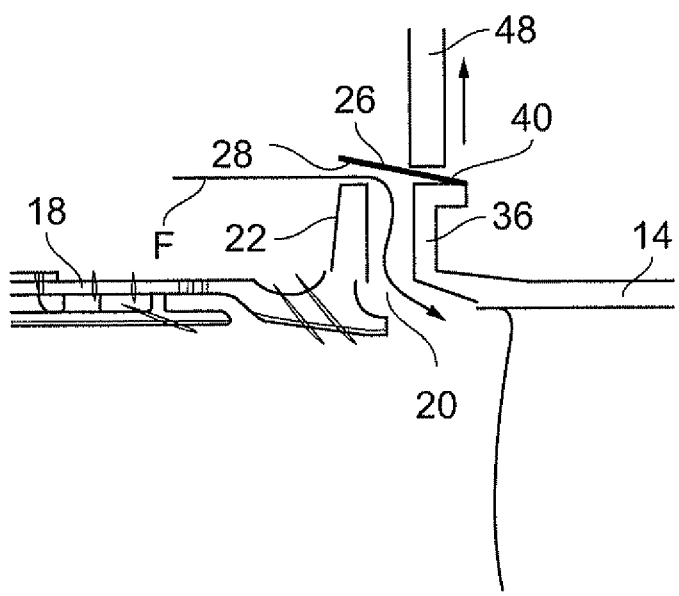
FIG. 5 corresponds to FIG. 3, but shows an alternative closure mechanism.

FIG. 5 shows an alternative embodiment in which the leaf springs 26 and 38 are replaced by a single leaf spring 26 which extends across the gap 20. Thus, the leaf spring 26 is mounted at a retaining portion 46 to the rib 36 and extends across the gap 20 to a sealing lip 28. In the condition shown in FIG. 5, the sealing lip 28 is spaced from the upper end of the flange 22, allowing the flow F to pass through the gap 20. An actuator device 48 comprising a circumferential array of pins (only one shown in FIG. 5), can be displaced radially inwardly so as to engage the leaf spring 28 until the sealing lip 26 contacts the outer end of the flange 22, so closing the gap 20.

By positioning the actuator pins 48 nearer to the retaining portion 46 than the lip 28, a mechanical advantage can be achieved, so that a relatively small displacement of the pins 48 will be adequate to achieve a relatively large displacement of the sealing lip 28.

In either of the embodiments of FIGS. 2 to 4 or FIG. 5, the motion of the actuator device comprising the actuator elements 30 and the pins 48 may be modulated in accordance with the operating condition of the engine, so that the NOx/CO trade at cruise conditions can be optimised across a range of cruise conditions.

It is also possible to control the radial temperature traverse into the turbine stage of the engine, by adjusting the mass flow rate of leakage air through the gap 20.

The invention claimed is:

1. A combustor for a gas turbine engine, the combustor comprising a circumferential wall defining an interior and an exterior of a housing and a circumferential gap that provides communication between the interior and the exterior of the housing, and an annular closure mechanism that is displaceable into and out of a closing relationship with the gap, the annular closure mechanism comprising an actuator device that is displaceable radially with respect to an axis of the housing.

2. A combustor as claimed in claim 1, in which the actuator device comprises an array of arcuate actuator elements extending circumferentially of the housing.

3. A combustor as claimed in claim 2, in which the actuator elements are displaceable by a common control mechanism.

4. A combustor as claimed in claim 2, in which adjacent circumferential edges of adjacent actuator elements engage one another in a sealing manner.

5. A combustor as claimed in claim 1, in which an annular sealing element is disposed between the housing and the closure mechanism.

6. A combustor as claimed in claim 5, in which the sealing element comprises an annular leaf spring.

7. A combustor as claimed in claim 5, in which the sealing element comprises a retaining portion mounted on the housing and a sealing lip which is displaceable relative to the retaining portion for engagement with the closure mechanism.

8. A combustor as claimed in claim 7, in which the sealing element is disposed so that a pressure differential between the interior and the exterior of the housing biases the sealing lip towards the closure mechanism when in the closing relationship.

9. A combustor as claimed claim 5, in which the sealing element is disposed on one side of the gap, and a second sealing element is disposed on the other side of the gap for sealing engagement with the closure mechanism throughout the range of movement of the closure mechanism.

10. A combustor as claimed in claim 5, in which the sealing element is mounted on one side of the gap and is displaceable by the closure mechanism to engage the other side of the gap to close the gap.

11. A combustor as claimed in claim 10, in which the closure mechanism engages the sealing element at a position which achieves a mechanical advantage between the closure mechanism and the region of the sealing element which engages the other side of the gap.

12. A combustor as claimed in claim 1, in which the closure mechanism is controlled by modulating means to vary the flow area of the gap.

13. A combustor as claimed in claim 3, in which the actuator elements are displaced radially inwardly and outwardly in unison.

14. A combustor as claimed in claim 4, in which adjacent circumferential edges of adjacent actuator elements engage one another at an overlapping point.

15. A combustor as claimed in claim 14, in which the overlapping joint is in a form of a splice or a lap joint where each member is in the form of a circumferentially extending flange.

16. An annular combustor for a gas turbine engine, the combustor comprising a circumferential wall defining an interior and exterior of a housing of the annular combustor and a circumferential gap that provides communication between the interior and the exterior of the housing, and an annular closure mechanism that is displaceable into and out of a closing relationship with the gap.

17. An annular combustor as claimed in claim 16, the closure mechanism comprising an actuator device which is displaceable radially with respect to the housing.

* * * * *